United States Patent
Morishita

(10) Patent No.: US 9,820,213 B1
(45) Date of Patent: Nov. 14, 2017

(54) TERMINAL DEVICE, PROGRAM, AND METHOD

(71) Applicant: GungHo Online Entertainment, Inc., Tokyo (JP)

(72) Inventor: Kazuki Morishita, Tokyo (JP)

(73) Assignee: GungHo Online Entertainment, Inc. (JP)

( * ) Notice: Subject to any disclaimer, the term of this patent is extended or adjusted under 35 U.S.C. 154(b) by 0 days.

(21) Appl. No.: 15/366,236

(22) Filed: Dec. 1, 2016

Related U.S. Application Data

(63) Continuation of application No. PCT/JP2016/071568, filed on Jul. 22, 2016.

(51) Int. Cl.
| | |
|---|---|
| *H04W 48/02* | (2009.01) |
| *H04M 1/725* | (2006.01) |
| *H04W 52/02* | (2009.01) |
| *G01P 15/00* | (2006.01) |
| *G01C 19/00* | (2013.01) |

(52) U.S. Cl.
CPC .......... *H04W 48/02* (2013.01); *G01C 19/00* (2013.01); *G01P 15/00* (2013.01); *H04M 1/72563* (2013.01); *H04W 52/0254* (2013.01)

(58) Field of Classification Search
CPC .. H04W 48/02; H04W 52/0254; G01C 19/00; H04M 1/72563; G01P 15/00
See application file for complete search history.

(56) References Cited

U.S. PATENT DOCUMENTS

| | | | |
|---|---|---|---|
| 5,572,646 A | 11/1996 | Kawai et al. | |
| 2004/0077340 A1* | 4/2004 | Forsyth | G06Q 30/02 455/414.1 |
| 2007/0150842 A1 | 6/2007 | Chaudhri et al. | |
| 2009/0185667 A1* | 7/2009 | Bychkov | H04M 1/72522 379/69 |
| 2010/0105365 A1* | 4/2010 | Kakiwaki | H04M 1/72519 455/414.1 |

(Continued)

FOREIGN PATENT DOCUMENTS

| | | |
|---|---|---|
| JP | H07-160853 A | 6/1995 |
| JP | 2002-346216 A | 12/2002 |

(Continued)

OTHER PUBLICATIONS

KIPO Abstract for 1020070082425. Retrieved Mar. 13, 2017.*

(Continued)

*Primary Examiner* — Nathan Mitchell
(74) *Attorney, Agent, or Firm* — Harness, Dickey & Pierce, P.L.C.

(57) ABSTRACT

A terminal device is provided that shifts a state between a plurality of states including a standby state in which execution of at least a partial application is restricted, and a normal state in which the restriction is canceled, and the terminal device includes a sensor unit configured to detect an ambient environment of the terminal device or a status of the terminal device itself in the standby state, and a control unit configured to, in a case in which the application is started up, restrict progress of the application in the normal state, and in the standby state, progress the application based on information detected by the sensor unit.

16 Claims, 6 Drawing Sheets

(56) References Cited

U.S. PATENT DOCUMENTS

| | | | |
|---|---|---|---|
| 2010/0190529 A1* | 7/2010 | Morobishi | G09G 3/20 |
| | | | 455/566 |
| 2011/0169928 A1* | 7/2011 | Gassel | H04N 13/044 |
| | | | 348/53 |
| 2012/0184323 A1* | 7/2012 | Hara | H04W 76/048 |
| | | | 455/525 |
| 2012/0220264 A1 | 8/2012 | Kawabata | |
| 2013/0135235 A1 | 5/2013 | Noutomi | |
| 2016/0150478 A1* | 5/2016 | Li | H04M 1/72569 |
| | | | 455/418 |
| 2016/0372083 A1* | 12/2016 | Taite | G09G 5/14 |

FOREIGN PATENT DOCUMENTS

| | | |
|---|---|---|
| JP | 2006-314405 A | 11/2006 |
| JP | 2007-117639 A | 5/2007 |
| JP | 2009-521753 A | 6/2009 |
| JP | 2012-095069 A | 5/2012 |
| JP | 2013-114419 A | 6/2013 |
| JP | 2015-012341 A | 1/2015 |
| JP | 2015-061130 A | 3/2015 |
| JP | 2015-167045 A | 9/2015 |
| JP | 2015-173691 A | 10/2015 |
| JP | 2016-019174 A | 2/2016 |
| KR | 1020070082425 * | 8/2007 |
| WO | WO-2007-063598 A1 | 6/2007 |

OTHER PUBLICATIONS

KR1020070082425 with machine translation. Lee et al. Generated Mar. 13, 2017.*

Japanese Office Action for JP Patent Application No. 2016-550654, dated Sep. 12, 2017; 10 pages.

* cited by examiner

TERMINAL DEVICE, PROGRAM, AND METHOD

The present application is a continuation application of International Application No. PCT/JP2016/071568, filed Jul. 22, 2016. The contents of this application are incorporated herein by reference in their entirety.

TECHNICAL FIELD

The present disclosure relates to a terminal device, a program, and a method that control the execution of an application based on an output from a sensor unit.

BACKGROUND

There has been conventionally known a terminal device that includes various sensors such as an acceleration sensor, and can control the execution of a game application based on an output from the acceleration sensor. For example, JP 2015-173691 A describes controlling the execution of a fishing video game application based on an output from an acceleration sensor provided in a terminal device such as a smartphone.

SUMMARY

Thus, in view of the above-described technique, the present disclosure provides a terminal device that can execute a new application that can be executed even in a standby state of the terminal device, using various embodiments.

Solution to Problem

According to an aspect of the present disclosure, there is provided a terminal device that shifts a state between a plurality of states including a standby state in which execution of at least a partial application is restricted, and a normal state in which the restriction is canceled, and the terminal device includes a sensor unit configured to detect an ambient environment of the terminal device or a status of the terminal device itself in the standby state, and a control unit configured to, in a case in which the application is started up, restrict progress of the application in the normal state, and in the standby state, progress the application based on information detected by the sensor unit.

According to an aspect of the present disclosure, there is provided a program for causing a computer that shifts a state between a plurality of states including a standby state in which execution of at least a partial application is restricted, and a normal state in which the restriction is canceled, to function as a control unit configured to, in a case in which the application is started up, restrict progress of the application in the normal state, and in the standby state, progress the application based on information about an ambient environment of the computer or a status of the computer that has been detected by a sensor unit included in the computer.

According to an aspect of the present disclosure, there is provided a method executed in a terminal device that shifts a state between a plurality of states including a standby state in which execution of at least a partial application is restricted, and a normal state in which the restriction is canceled, and the method includes a step of detecting, by a sensor unit, an ambient environment of the terminal device or a status of the terminal device itself in the standby state, and a step of, by a control unit, in a case in which the application is started up, restricting progress of the application in the normal state, and in the standby state, controlling progress of the application based on information detected in the sensor unit.

Advantageous Effects of Invention

According to various embodiments of the present disclosure, there is provided a terminal device that can execute a new application that can be executed even in a standby state of the terminal device.

In addition, the above-described effect is merely an example provided for descriptive purposes, and effects are not limited to the above-described effect. In addition to the above-described effect, or in place of the above-described effect, any effect described in the present disclosure, or an effect obvious for the one skilled in the art can also be achieved.

DETAILED DESCRIPTION

Figure 1:
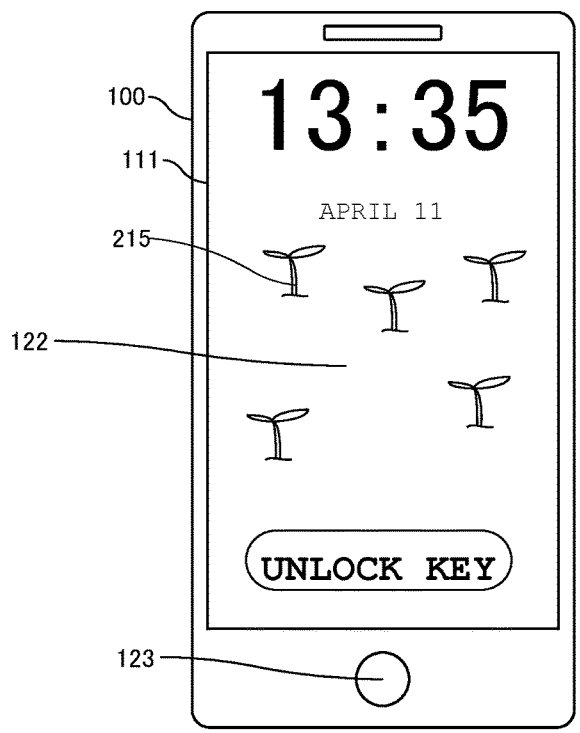
FIG. 1 is a diagram illustrating a terminal device 100 according to a first embodiment of the present disclosure.

Various embodiments of the present disclosure will be described with reference to the attached drawings. In addition, common constituent elements in the drawings are assigned the same reference numeral.

1. Terminal Device 100 According to First Embodiment of Present Disclosure FIG. 1 is a diagram illustrating a terminal device 100 according to a first embodiment of the present disclosure. According to FIG. 1, as an example, the terminal device 100 includes a display 111, a touch panel 122 disposed with being superimposed on the display 111, and a hardware key 123 for restricting the display of the display 111, that is, turning off the display. Examples of such a terminal device 100 include a portable terminal device that can perform wireless communication, as represented by a smartphone. In addition to this, a portable game machine, a feature phone, a portable information terminal, a personal digital assistance (PDA), a laptop personal computer, and the like can be preferably applied. In addition, even a terminal device such as a desktop personal computer that is not carried by a user on a daily basis can be applied as the terminal device 100.

By reading out 1 or a plurality of programs, the terminal device 100 can execute an application corresponding to the programs. For example, for preventing a malfunction caused by a user, the terminal device 100 has a "standby state" in which the execution of at least a partial application of the above-described application is restricted, and the restriction can be canceled by, for example, the user operating a predetermined icon displayed on the display 111. In addition, the terminal device 100 has a "normal state" in which the restriction of the execution of the above-described application is canceled, and various operations such as startup and execution of an application can be performed according to the desire of the user. Furthermore, the terminal device 100 has a "sleep state" in which the execution of at least a partial application is restricted and the display of the display 111 is turned off, in response to the detection of the user not operating for a predetermined period or more in the above-described standby state or normal state, or the detection of the press of a predetermined hardware key that is performed by the user.

Even in the standby state in which the execution of the partial application is restricted, the terminal device 100 can progress an application started up in the normal state, based on information detected by a sensor unit.

FIG. 1 illustrates an example of a screen of a standby screen application displayed on the display 111 in the standby state of the terminal device 100. According to FIG. 1, in the standby state of the terminal device 100, information about current time and date, and an unlock key for inputting an instruction for shifting from the standby state to the normal state are displayed on the display 111.

In the present embodiment, the standby screen application executed in the standby state can be a game application. Thus, in addition to the above-described display, for example, 1 or a plurality of plant characters 215 is displayed for displaying a progress status of the game application. Then, based on information detected by a sensor 113, the growth degree of the characters 215 is controlled.

2. Configuration Example of Terminal Device 100

Figure 2:
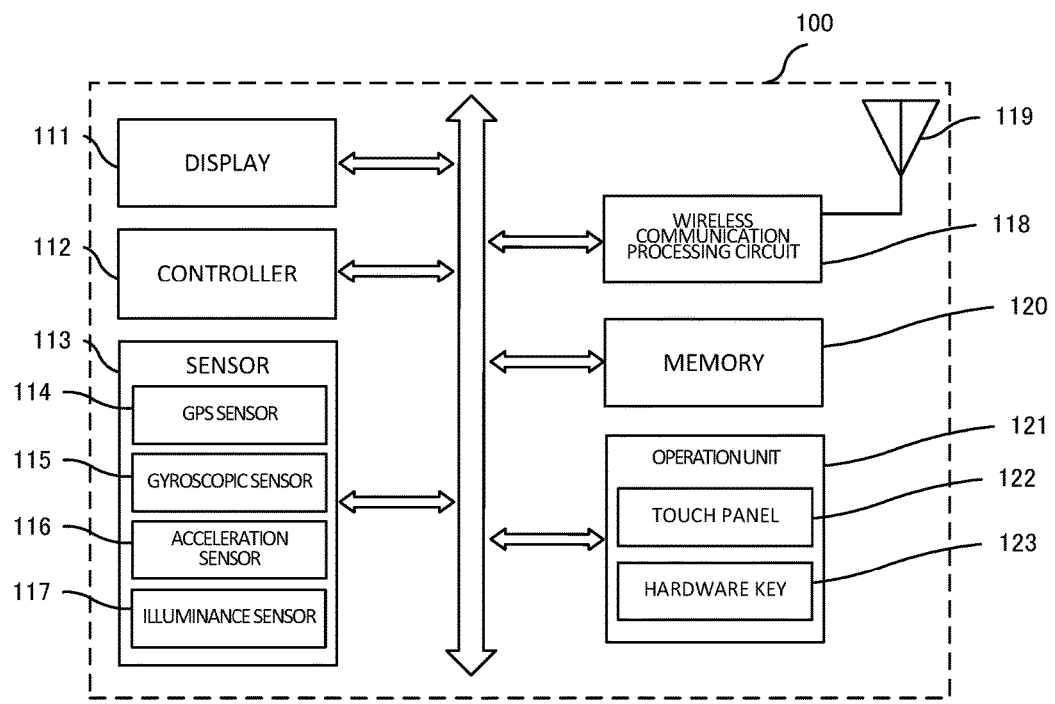
FIG. 2 is a block diagram illustrating a configuration example of the terminal device 100 according to the first embodiment of the present disclosure.

FIG. 2 is a block diagram illustrating a configuration example of the terminal device 100 according to the first embodiment of the present disclosure. The terminal device 100 does not have to include all the constituent elements illustrated in FIG. 2, and can employ a partially-omitted configuration, or other constituent elements can be added.

According to FIG. 2, the terminal device 100 includes the display 111, a controller 112, the sensor 113 including a GPS sensor 114, a gyroscopic sensor 115, an acceleration sensor 116, and an illuminance sensor 117, a communication unit including a wireless communication processing circuit 118 and an antenna 119, a memory 120 including a random access memory (RAM), a read-only memory (ROM), a nonvolatile memory (hard disk drive (HDD) depend on the cases), and the like, and an operation unit 121 including the touch panel 122 and the hardware key 123. In addition, these constituent elements are electrically connected to one another via a control line and a data line.

According to an instruction from the controller 112, the display 111 reads out image information stored in the memory 120, to perform various types of display. The display 111 includes, for example, a liquid crystal display, and functions as a display unit.

The operation unit 121 includes the touch panel 122, the hardware key 123, and the like, and receives various instructions and inputs from the user. The touch panel 122 is disposed in such a manner as to cover the display 111, and outputs, to the controller 112, information of a position coordinate corresponding to image data displayed by the display 111. Known touch panel systems such as a resistance film system, a capacitive coupling system, an ultrasound surface acoustic wave system, and the like can be used. In the present embodiment, the touch panel 122 detects a swipe operation and a tap operation performed by an instruction body on each icon displayed on the display 111.

As an example, in the standby state, an operation performed by the user on an unlock icon displayed on the display 111 is detected via the touch panel 122. In addition, in the sleep state, the standby state, and the normal state, the press of the hardware key 123 (power key) that is performed by the user is detected.

The controller 112 includes a central processing unit (CPU) (microcomputer), and functions as a control unit that controls other connected constituent elements based on various programs stored in the memory 120. Specifically, the controller 112 reads out programs respectively corresponding to a plurality of applications including applications executable even in the standby state, from the memory 120, and executes the programs. In addition, the controller 112 generates various types of operation information based on outputs from the touch panel 122. In addition, the controller 112 may be constituted by a single CPU, or may be constituted by a plurality of CPUs. In addition, a graphics processing unit (GPU) specialized in image processing may be separately provided.

As an example, the memory 120 includes a ROM, a RAM, a nonvolatile memory, and the like, and functions as a storage unit. The ROM stores programs for executing a plurality of applications including applications executable even in the standby state, for each application. The RAM is a memory used for writing and reading data while various commands generated by the execution of the programs stored in the ROM are being processed by the controller 112. The nonvolatile memory is a memory in which writing and reading of data is executed by the execution of the programs, and the data written into the nonvolatile memory is saved even after the execution of the programs is ended.

In addition, in the present embodiment, in the processing of a game executed in the standby screen application, a height parameter, a growth acceleration parameter, a growth speed parameter, and the like of the plant characters are appropriately stored in the memory 120, although these are not especially illustrated in detail in the drawings.

The sensor 113 functions as a sensor unit that detects an ambient environment of the terminal device 100 or a status of the terminal device itself. Examples of the ambient environment of the terminal device 100 include illuminance, temperature, humidity, and the like. In addition, the status of the terminal device 100 itself refers to a status changed by an external factor being added to the terminal device 100. Example of the status include position information such as a current position of the terminal device 100, a movement acceleration at which the terminal device 100 has moved, the orientation of the terminal device 100, and the like. More specifically, as an example of the sensor 113, in addition to the GPS sensor 114, the gyroscopic sensor 115, the acceleration sensor 116, and the illuminance sensor 117, a temperature sensor, a humidity sensor, an atmospheric pressure sensor, a geomagnetic sensor, a distance sensor, a magnetic sensor, a camera, a microphone, and the like can be used as a sensor. In addition, a timer for detecting a current time can also be used as a sensor.

The sensor 113 can execute detection processing in the background, even in the standby state and the sleep state, in addition to the normal state. Detected information is output to the controller 112 as needed, and used for the controller 112 executing an application.

The wireless communication processing circuit 118 performs processing such as modulation and demodulation via the connected antenna 119, for transmitting and receiving information between the terminal device 100 and a server device installed at a remote place or another terminal device. For example, the wireless communication processing circuit 118 performs processing for receiving, from the server device, a program for executing each application, and various types of information such as user information that are used in applications, according to the progress of applications. In addition, the wireless communication processing circuit 118 performs processing for transmitting a processing result obtained by executing the applications, to the server device.

This wireless communication processing circuit 118 is processed based on a broadband wireless communication system represented by the Wideband-Code Division Multiple Access (W-CDMA) system. Alternatively, the wireless communication processing circuit 118 can be processed based on a wireless local area network (LAN) represented by the IEEE802.11, or a system related to narrowband wireless communication such as the Bluetooth (registered trademark).

The wireless communication processing circuit 118 and the antenna 119 constitute a communication unit. In addition, in place of or in addition to wireless communication, wired communication can also be used. In this case, wired communication can be achieved by providing a communication processing circuit for wired communication, in place of or in addition to the wireless communication processing circuit 118.

Figure 3:
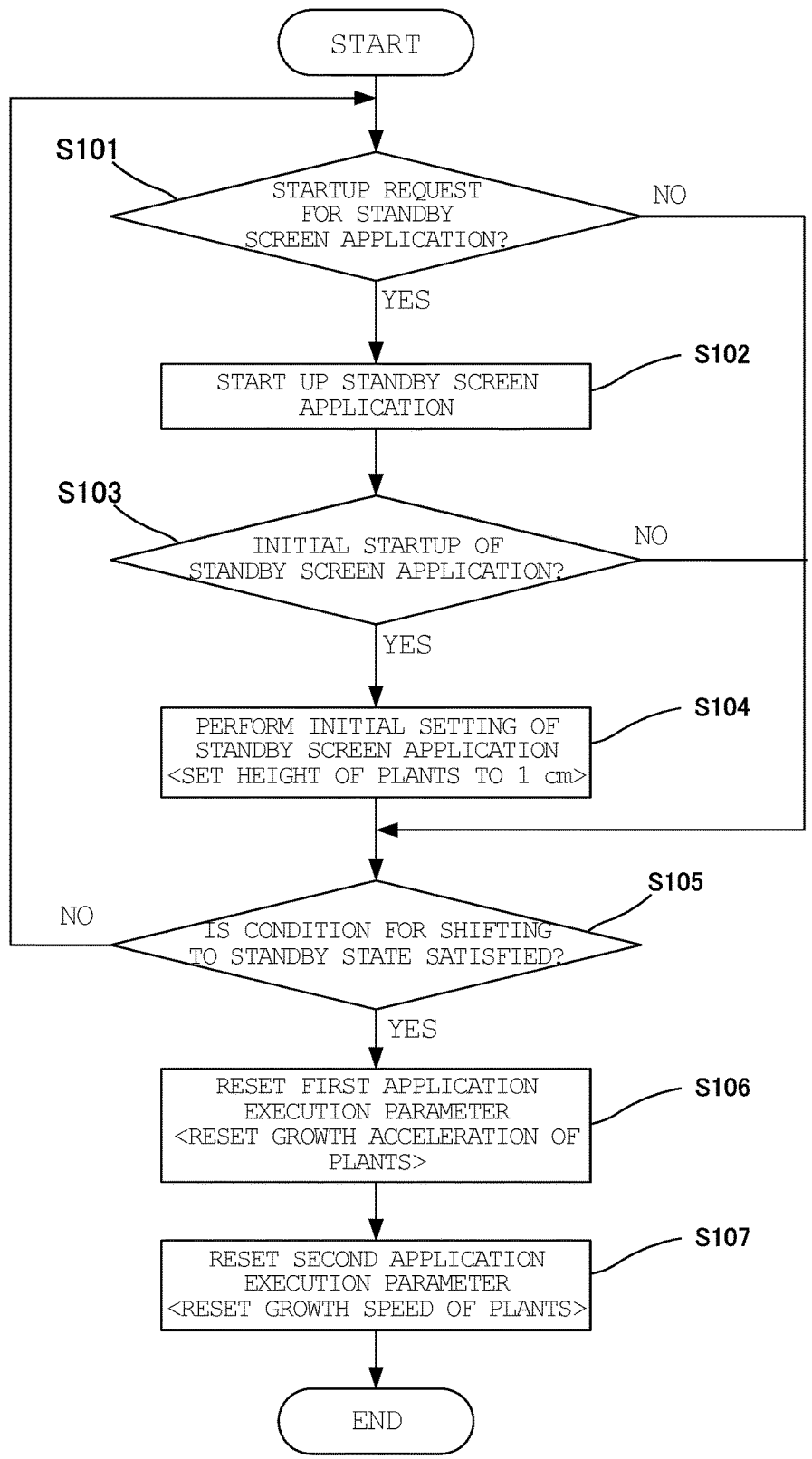
FIG. 3 is a diagram illustrating a processing flow executed in the terminal device 100 according to the first embodiment of the present disclosure.

3. Processing Flow Executed in Terminal Device 100 in State Other than Standby State FIG. 3 is a diagram illustrating a processing flow executed in the terminal device 100 according to the first embodiment of the present disclosure. Specifically, FIG. 3 illustrates a processing flow executed when the terminal device 100 is in a state other than the standby state (mainly, the normal state).

Figure 4:
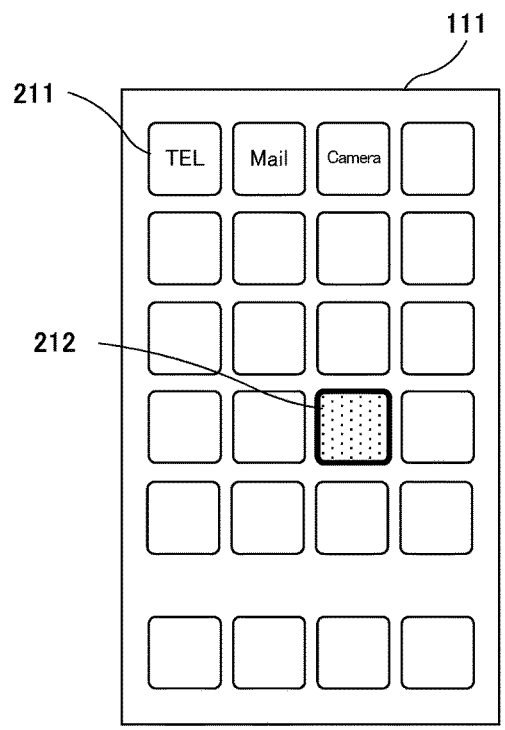
FIG. 4 is a diagram illustrating an example of a screen displayed on a display 111 of the terminal device 100 according to the first embodiment of the present disclosure.

In this case, FIG. 4 is a diagram illustrating an example of a screen displayed on the display 111 of the terminal device 100 according to the first embodiment of the present disclosure. Specifically, FIG. 4 illustrates an example of a screen displayed on the display 111 when the terminal device 100 is in the normal state. More specifically, in the normal state, various icons 211 for starting up and executing applications such as "TEL" (telephone), "Mail" (e-mail), and "Camera" are displayed on the display 111. As one of the icons, an icon 212 is displayed. The icon 212 is displayed for starting up the standby screen application, which is a game application that can perform predetermined display on the display 111 and execute a predetermined game in the standby state.

In the processing flow illustrated in FIG. 3, first of all, it is determined whether a user operation performed on the icon 212 illustrated in FIG. 4 has been detected via the touch panel 122. More specifically, the controller 112 of the terminal device 100 determines whether a startup request for the standby screen application has been received, in response to an output from the touch panel 122 (S101).

Figure 5:
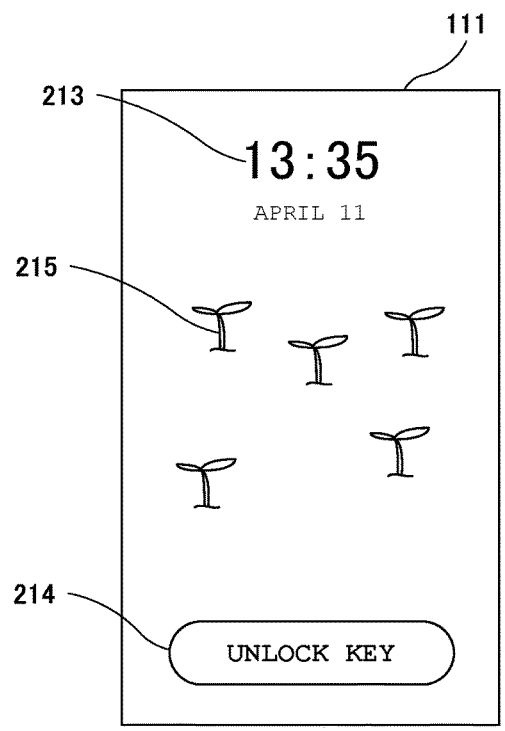
FIG. 5 is a diagram illustrating an example of a screen displayed on the display 111 of the terminal device 100 according to the first embodiment of the present disclosure.

In this case, FIG. 5 is a diagram illustrating an example of a screen displayed on the display 111 of the terminal device 100 according to the first embodiment of the present disclosure. As illustrated in FIG. 5, the standby screen application is an application for displaying current date and time information 213 and an unlock key icon 214 for shifting from the standby state to the normal state, displaying the plant characters 215, and executing a game of cultivating and growing the plant characters 215 according to a growth degree determined based on information detected by the sensor 113, in the standby state of the terminal device 100. Then, when the standby screen application is being executed, the plant characters 215 are displayed on the display 111 in the standby state, and a progress status of the application is displayed.

Referring back to the processing flow illustrated in FIG. 3, if the above-described startup request has been received, the controller 112 reads out a program from the memory 120, and starts up the standby screen application as illustrated in FIG. 5 (S102). Next, it is determined whether the standby screen application started up in S102 is initial startup (S103). If the startup is initial startup (i.e., if there is no saved data on the growth degree of the plant characters 215 of the standby screen application), an initial setting of the standby screen application is performed. In this case, a height parameter of the plant characters 215 is set to 1 cm being an initial setting (the height may be a virtual height) (S104).

Next, the controller 112 determines whether a condition for shifting the terminal device 100 to the standby state is satisfied (S105). As an example, the controller 112 determines whether a user not operating for a predetermined period or more has been detected in the normal state, or whether the press of the hardware key 123 that is performed by the user has been detected in the sleep state, to which the terminal device 100 shifts by detecting the press of the hardware key 123 that is performed by the user. In addition, the determination is not limited to such determination, and the controller 112 can determine whether a user not operating for a predetermined period or more has been detected in the normal state, or whether the press of the hardware key 123 that is performed by the user has been detected, without going through the sleep state.

Next, if the controller 112 determines that the condition for shifting the terminal device 100 to the standby state is satisfied, the controller 112 resets an application execution parameter determined based on information detected by the sensor 113 that is temporarily stored in the execution of the standby screen application (S106 and S107). Specifically, the controller 112 resets a first application execution parameter for calculating a height parameter of the plant characters 215 (growth acceleration parameter of the plant characters 215), and a second application execution parameter (growth speed parameter of the plant characters 215).

In addition, if it is not determined in S105 that a condition for shifting to the standby state is satisfied, the processing returns to the beginning of the processing flow.

Then, the controller 112 ends the processing flow executed when the terminal device 100 is in a state other than the standby state (mainly, the normal state).

4. Processing Flow Executed in Terminal Device 100 in Standby State

Figure 6:
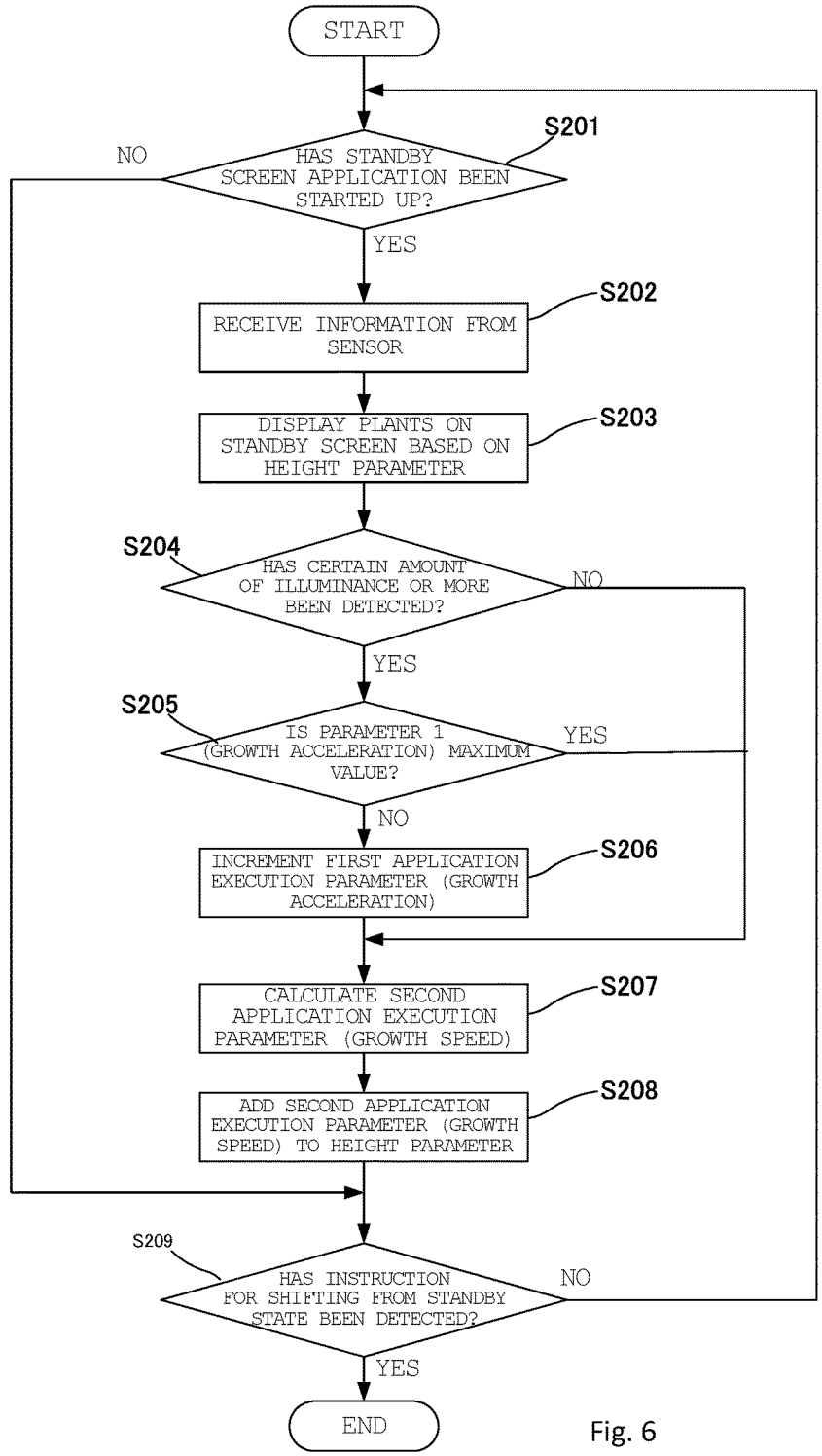
FIG. 6 is a diagram illustrating a processing flow executed in the terminal device 100 according to the first embodiment of the present disclosure.

FIG. 6 is a diagram illustrating a processing flow executed in the terminal device 100 according to the first embodiment of the present disclosure. Specifically, FIG. 6 illustrates a processing flow executed when the terminal device 100 is the standby state.

The processing flow illustrated in FIG. 6 is started from the controller 112 determining whether the terminal device 100 is in the standby state, and the standby screen application has been started up (S201). The standby screen application is started up if the controller 112 determines that a startup request for the standby screen application has been received in the processing flow illustrated in FIG. 3.

In addition, as an example, the terminal device 100 shifts to the standby state by detecting a user not operating for a predetermined period or more in the normal state, or by detecting the press of the hardware key 123 that is performed by the user, in the sleep state, to which the terminal device 100 shifts by detecting the press of the hardware key 123 that is performed by the user. In addition, the transition is not limited to this, and the terminal device 100 can shift by detecting a user not operating for a predetermined period or more in the normal state, or by detecting the press of the hardware key 123 that is performed by the user, without going through the sleep state.

If the controller 112 determines that the standby screen application has been started up, information detected by the sensor 113 is received (S202). In the present embodiment, as an example, an ambient illuminance of the terminal device 100 that has been detected by the illuminance sensor 117 is detected, and information about the detected illuminance is received by the controller 112.

Then, the controller 112 changes the mode of the plant characters 215 based on a height parameter stored in the memory 120, and displays the plant characters 215 on the display 111 (S203). For example, if the processing flow is executed after the standby screen application has been initially started up, the height parameter is set to 1 cm as an initial setting. Thus, as illustrated in FIG. 5, the plant characters 215 are displayed in such a display mode as "young trees".

Next, the controller 112 determines whether a certain amount of illuminance or more has been detected, based on information about illuminance that has been received from the sensor 113 (specifically, the illuminance sensor 117) (S204). Then, if it has been determined that a certain amount of illuminance or more has been detected, the controller 112 refers to the first application execution parameter (growth acceleration parameter) stored in the memory 120, and determines whether the parameter reaches the predetermined maximum value (S205). Then, if the parameter does not reach the maximum value, the first application execution parameter (growth acceleration parameter) is incremented by an amount corresponding to the received illuminance (S206).

The amount of increment of the first application execution parameter is determined by the controller 112 by storing a table associating the detected illuminance and the amount of increment, into the memory 120, and by referring to the table, although this is not illustrated in the drawing.

In addition, if it is determined in S205 that the parameter reaches the maximum value, the processing proceeds to the next processing without incrementing the first application execution parameter.

Next, the controller 112 calculates the second application execution parameter (growth speed parameter) of the plant characters 215 based on the determined growth acceleration parameter (S207). In addition, the calculation is performed by, for example, adding the determined growth acceleration parameter to a prestored growth speed parameter.

Then, the controller 112 calculates a height parameter of the plant characters 215 based on the calculated growth speed parameter, and stores the calculated height parameter into the memory 120 (S208).

Next, the controller 112 determines whether an instruction for shifting from the standby state to the normal state has been detected (S209). As an example, based on whether a user operation on the unlock key icon 214 displayed on the display 111 has been detected on the touch panel 122, the detection of the above-described instruction is determined. Then, if the instruction has been detected, the terminal device 100 is shifted to the normal state, and the processing returns to the processing flow illustrated in FIG. 3. On the other hand, if the instruction has not been detected, the processing returns to the beginning of the processing flow illustrated in FIG. 6.

In addition, in S203, the controller 112 changes the mode of the plant characters 215 based on the height parameter stored in the memory 120, and displays the plant characters 215 on the display 111. Nevertheless, in the next processing loop, the display mode of the plant characters 215 is changed based on the height parameter calculated in S208 of the previous processing loop.

Figure 7:
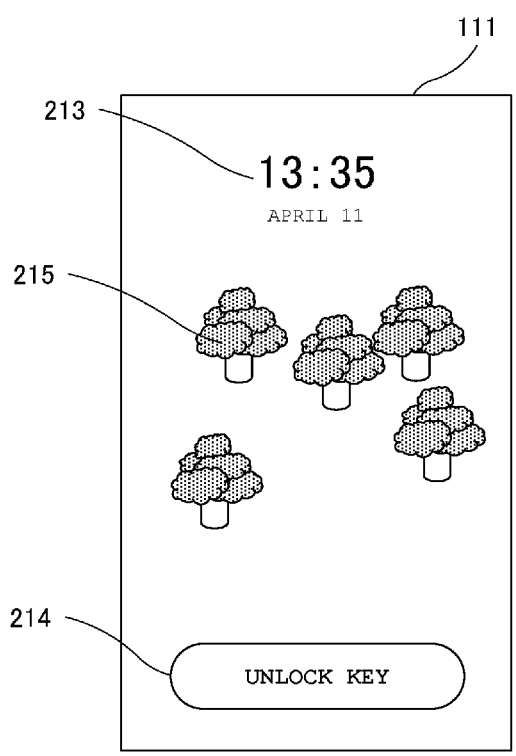
FIG. 7 is a diagram illustrating an example of a screen displayed on the display 111 of the terminal device 100 according to the first embodiment of the present disclosure.

FIG. 7 is a diagram illustrating an example of a screen displayed on the display 111 of the terminal device 100 according to the first embodiment of the present disclosure. As an example, as illustrated in FIG. 7, plant characters 215 are displayed based on a calculated new height parameter.

In addition, in FIG. 6, in the standby state of the terminal device 100, the sensor 113 detects the ambient environment of the terminal device 100 or the status of the terminal device itself, and the execution of the standby screen application is controlled based on the detected information. Nevertheless, in addition to this, also when the terminal device 100 is in the sleep state, in the background and at every predetermined period, the sensor 113 can detect the ambient environment of the terminal device 100 or the status of the terminal device itself, and the standby screen application can be executed (i.e., the processing flow illustrated in FIG. 6 can be executed) based on the detected information.

In such a case, by executing the standby screen application at a predetermined interval, each time the standby screen application is executed, a growth acceleration parameter, a growth speed parameter, and a height parameter of the plant characters 215 are calculated, and the calculated height parameter is stored into the memory 120. In addition, because the above-described processing is performed in the background, in the sleep state, the display processing performed in S203 of FIG. 6 is not performed.

Figure 8:
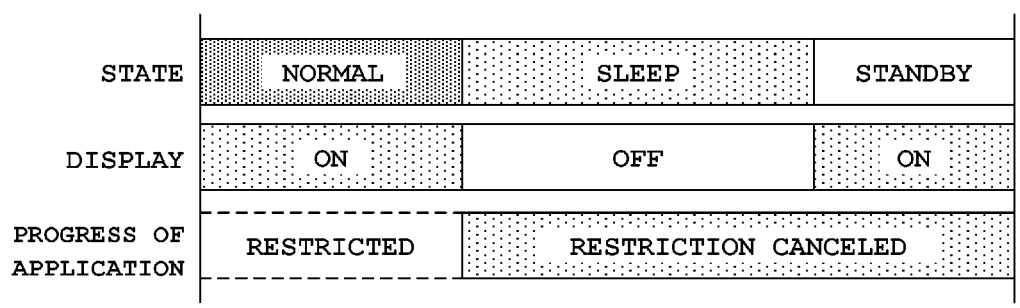
FIG. 8 is a diagram illustrating a state transition of the terminal device 100 according to the first embodiment of the present disclosure.

5. Relation Between State of Terminal Device 100, State of Display of Display 111, and Progress Status of Standby Screen Application FIG. 8 is a diagram illustrating a state transition of the terminal device 100 according to the first embodiment of the present disclosure. Specifically, FIG. 8 is a diagram conceptually illustrating the relation between the state of the terminal device 100, the state of display of the display 111, and the progress status of the standby screen application that is obtainable when the terminal device 100 executes the processing flows illustrated in FIGS. 3 and 6.

In the first embodiment of the present disclosure, as obviously seen from the processing flow in the normal state that is illustrated in FIG. 3, if the standby screen application is once started up in S101, the processing of the standby screen application that uses information from the sensor 113 is not performed in the subsequent processing. On the other hand, as described in the processing flow in the standby state that is illustrated in FIG. 6, and as described above, in the present embodiment, in the standby state and the sleep state, in the processing in S202, information from the sensor 113 is received. Then, in the processing from S203 to S208, the progress of the application that is based on the information is performed. In other words, in the present embodiment, if the standby screen application is started up, while the progress of the application is restricted in the normal state, the progress of the application is executed based on information detected by the sensor 113, in the standby state and the sleep state.

Referring to FIG. 8, as described above, the terminal device 100 has at least 3 states, i.e., the sleep state, the standby state, and the normal state. In the normal state, the display 111 is turned on, and for example, display as illustrated in FIG. 4 is performed. In this state, as illustrated in FIG. 3, the standby screen application is in a status in which the progress that uses information from the sensor 113 is restricted.

As a specific example, the above-described status in which the progress is restricted is a status in which only the input of a user name used in the progress of the standby screen application, the selection of a character type, and changes of these, and setting input processing and setting change processing of charges of various items used in the progress of the application are permitted, and processing related to the growth of the plant characters 215 that is performed according to the progress of the application is restricted. In addition, in a status in which the progress of the application is restricted in the normal state, on the display 111, display other than those related to the above-described setting input and setting change is not performed. Thus, in the state, the user is restricted from checking the progress status of the application, and the user and the sensor 113 are restricted from intervening in the application.

Next, if the state of the terminal device 100 shifts from the normal state to the sleep state, the display of the display 111 is turned off. On the other hand, the standby screen application receives information from the sensor 113 in the background even in the sleep state, and performs the growing processing of the plant characters 215 that is based on the information, to execute the progress of the application.

Next, if the state of the terminal device 100 shifts from the sleep state to the standby state, the display of the standby screen application is performed on the display 111. In addition, the application receives information from the sensor 113 in the standby state, and performs the growing processing of the plant characters 215 that is based on the information, to execute the progress of the application. In other words, in the standby state, because the growth process of the plant characters 215 is displayed on the display 111, the user can check the progress status of the application.

In the above-described manner, in the present embodiment, on a standby screen, which is normally provided only for checking a current time, and on which an unlock key for canceling the standby state is normally displayed, a game of growing the plant characters 215 is executed, so that a standby state with a wealth of tastes can be realized. In addition, normally, the progress of a game application can be checked only after the game application is started up in a state in which the terminal device 100 is in the normal state. Nevertheless, in the present embodiment, a game is executed in the standby state to which the state always shifts when the user operates the terminal device 100, so that the degree of user's gaze at the game can be further enhanced. In addition, unlike conventional game applications and the like, in the normal state, only the processing related to the setting of an application and display thereof are permitted, and the progress of the application and display of a status thereof are not performed. Thus, a new taste can be provided to users. In addition, in the present embodiment, in the standby state in which the execution of other applications is restricted, a game with high processing load and processing of information received from the sensor 113 are performed. Thus, the processing resources of the terminal device 100 can be effectively utilized.

In addition, in the above-described embodiment, the limitative wordings such as "processing that uses information from the sensor is not performed" and "processing other than display is not performed" are partially used. Nevertheless, these wordings merely mean that these types of processing are not executed in the standby screen application according to the present embodiment. For example, information from the sensor 113 can be received and used for the execution of other applications even in the normal state. In addition, in the normal state, display related to other applications can be performed. Furthermore, wordings such as "execution is restricted" and "progress is restricted" are used. Nevertheless, these wordings do not always mean restricting all the operations of the terminal device and all the operations of each application, and include cases in which only a part of these is restricted.

6. Other Embodiments

In the first embodiment, the description has been given of an example of using the illuminance sensor 117 as the sensor 113. Nevertheless, known sensors such as the GPS sensor 114, the gyroscopic sensor 115, and/or the acceleration sensor 116 can be used. For example, in the case of using the GPS sensor 114, the gyroscopic sensor 115, and/or the acceleration sensor 116, a table associating a distance by which and a direction in which the terminal device 100 has moved and a growth acceleration parameter can be prepared in the memory 120, and a height parameter can be calculated according to the distance by which and the direction in which the terminal device 100 has moved. In addition, for example, a user's operation of shaking the terminal device 100 can be detected, a table associating a direction in which and the number of times the shake operation has been performed and a growth acceleration parameter can be prepared in the memory 120, and a height parameter can be calculated according to the direction in which and the number of times the shake operation has been performed.

In addition, in the first embodiment, in the standby state of the terminal device 100, a game of growing the plant characters 215 is executed by executing the standby screen application. Nevertheless, it should be appreciated that games are not limited to the game. For example, a position information game that uses the GPS sensor 114 and the like can also be executed.

In any of the above-described embodiments, on a standby screen, which is normally provided only for checking a current time, and on which an unlock key for canceling the standby state is normally displayed, a predetermined game can be executed, so that a standby state with a wealth of tastes can be realized. In addition, normally, the progress of a game application can be checked only after the game application is started up in a state in which the terminal device 100 is in the normal state. Nevertheless, in the present embodiment, a game is executed in the standby state to which the state always shifts when the user operates the terminal device 100, so that the degree of user's gaze at the game can be further enhanced. In addition, unlike conventional game applications and the like, in the normal state, only the processing related to the setting of an application and display thereof are permitted, and the progress of the application and display of a status thereof are not performed. Thus, a new taste can be provided to users. In addition, in the present embodiment, in the standby state in which the execution of other applications is restricted, a game with high processing load and processing of information received from the sensor 113 are performed. Thus, the processing resources of the terminal device 100 can be effectively utilized.

In addition, in the first embodiment and another embodiment, and other embodiments, a system according to the present disclosure has been described. Nevertheless, a system can be formed by appropriately combining or replacing the elements described in the embodiments.

The processing and procedure described in the present specification can be realized not only by the components explicitly described in the embodiments, but also by software, hardware, or a combination of these. Specifically, the processing and procedure described in the present specification can be realized by implementing logic corresponding to the processing, in media such as an integrated circuit, a volatile memory, a nonvolatile memory, a magnetic disc, and an optical storage. In addition, the processing and procedure described in the present specification can be implemented with the processing and procedure serving as computer programs, and the processing and procedure can be executed by various computers including terminal devices and server devices.

Even if the description has been given of a case in which the processing and procedure described in the present specification is executed by a single device, software, component, or module, such processing or procedure can also be executed by a plurality of devices, a plurality of pieces of software, a plurality of components, and/or a plurality of modules. In addition, even if the description has been given of a case in which various types of information described the present specification are stored into a single memory unit or storage unit, such information can also be stored, in a dispersed manner, into a plurality of memory units disposed in a single device or a plurality of memory units disposed in a plurality of devices in a dispersed manner. Furthermore, software and hardware elements described in the present specification can be realized by being integrated into constituent elements smaller in number than these, or by being disintegrated into constituent elements larger in number than these.

The invention claimed is:

1. A terminal device comprising:
a memory configured to store computer-readable instructions;
a processor configured to execute the computer-readable instructions so as to:
execute and progress a plurality of applications on the terminal device, the plurality of applications having first and second applications which are different from each other;
set a standby state of the terminal device, restrict execution and progress of the first application in the standby state, and allow progress of the second application in the standby state;
set a normal state of the terminal device, allow the execution and the progress of the first application in the normal state, and restrict the progress of the second application in the normal state; and
set a sleep state of the terminal device, restrict the execution and the progress of the first application in the sleep state, and allow the progress of the second application in the sleep state; and
a sensor configured to detect an ambient environment or a status of the terminal device,
wherein execution of the second application is conducted based on one of the processor being in the normal state and the sensor detecting the standby or sleep states, and
a degree of the progress of the second application in the standby and sleep states is based on the detection of the sensor.

2. The terminal device according to claim 1, further comprising:
a display configured to display predetermined information in the standby state and the normal state,
wherein the display is configured to be turned off in the sleep state, and
wherein the sensor is configured to detect a change in the ambient environment or the status of the terminal device in the sleep states.

3. The terminal device according to claim 2,
wherein the display is configured to display a progress status of the second application in the standby state, and the display is configured to not display the progress status of the second application in the normal state.

4. The terminal device according to claim 2, further comprising:
an operation unit configured to detect an instruction input performed by a user and to output an input signal,
wherein when the processor detects the input signal in the sleep state, the processor is configured to change the sleep state to the standby state, and
when the processor detects the input signal in the standby state, the processor is configured to change the standby state to the normal state.

5. The terminal device according to claim 1, further comprising:
an operation unit configured to detect an instruction input performed by a user and to output an input signal,
wherein when the processor detects the input signal only in the normal state, the processor is configured to allow a setting change of the second application based on the instruction input by the user.

6. The terminal device according to claim 1,
wherein the second application is a game application.

7. The terminal device according to claim 1, wherein the sensor includes any one of an illuminance sensor, an acceleration sensor, a gyroscopic sensor, a GPS sensor, an atmospheric pressure sensor, a geomagnetic sensor, a distance sensor, a magnetic sensor, a microphone, a camera, and a timer, or a combination of these.

8. A computer program product embodying computer-readable instructions stored on a non-transitory computer-readable medium for causing a computer to execute the computer-readable instructions to perform the steps of:
executing and progressing a plurality of applications on a terminal device, the plurality of applications having first and second applications which are different from each other;
setting a standby state of the terminal device, restricting execution and progress of the first application in the standby state, and allowing progress of the second application in the standby state;

setting a normal state of the terminal device, allowing the execution and the progress of the first application in the normal state, and restricting the progress of the second application in the normal state;

setting a sleep state of the terminal device, restricting the execution and the progress of the first application in the sleep state, and allowing the progress of the second application in the sleep state; and detecting an ambient environment or a status of the terminal device, wherein execution of the second application is conducted based on one of the processor being in the normal state and the detected ambient environment or the detected status being in the standby or sleep states, and a degree of the progress of the second application in the standby and sleep states is based on the detected ambient environment or the detected status.

9. A method for causing a processor to execute computer-readable instructions stored in a memory in a terminal device, the method comprising execution on the processor the steps of:

executing and progressing a plurality of applications on the terminal device, the plurality of applications having first and second applications which are different from each other;

setting a standby state of the terminal device, restricting execution and progress of the first application in the standby state, and allowing progress of the second application in the standby state;

setting a normal state of the terminal device, allowing the execution and the progress of the first application in the normal state, and restricting the progress of the second application in the normal state;

setting a sleep state of the terminal device, restricting the execution and the progress of the first application in the sleep state, and allowing the progress of the second application in the sleep state; and detecting an ambient environment or a status of the terminal device, wherein execution of the second application is conducted based on one of the processor being in the normal state and the detected ambient environment or the detected status being in the standby or sleep states, and a degree of the progress of the second application in the standby and sleep states is based on the detected ambient environment or the detected status.

10. The terminal device according to claim 3, further comprising:

an operation unit configured to detect an instruction input performed by a user and to output an input signal, wherein when the processor detects the input signal in the sleep state, the processor is configured to change the sleep state to the standby state, and when the processor detects the input signal in the standby state, the processor is configured to change the standby state to the normal state.

11. The terminal device according to claim 1, further comprising:

an operation unit configured to detect an instruction input performed by a user and to output an input signal, wherein when the processor detects the input signal in the sleep state, the processor is configured to change the sleep state to the standby state, and when the processor detects the input signal in the standby state, the processor is configured to change the standby state to the normal state.

12. The terminal device according to claim 3, further comprising:

an operation unit configured to detect an instruction input performed by a user and to output an input signal, wherein when the processor detects the input signal in the sleep state, the processor is configured to change the sleep state to the standby state, and when the processor detects the input signal in the standby state, the processor is configured to change the standby state to the normal state.

13. The terminal device according to claim 5, wherein when the processor detects the input signal in the sleep state, the processor is configured to change the sleep state to the standby state, and when the processor detects the input signal in the standby state, the processor is configured to change the standby state to the normal state.

14. The terminal device according to claim 2, further comprising:

an operation unit configured to detect an instruction input performed by a user and to output an input signal, wherein when the processor detects the input signal only in the normal state, the processor is configured to allow a setting change of the second application based on the instruction input by the user.

15. The terminal device according to claim 3, further comprising:

an operation unit configured to detect an instruction input performed by a user and to output an input signal, wherein when the processor detects the input signal only in the normal state, the processor is configured to allow a setting change of the second application based on the instruction input by the user.

16. The terminal device according to claim 4, wherein when the processor detects the input signal only in the normal state, the processor is configured to allow a setting change of the second application based on the instruction input by the user.

* * * * *